(No Model.) 2 Sheets—Sheet 1.

R. D. SNYDER.
GARDEN PLOW.

No. 391,654. Patented Oct. 23, 1888.

WITNESSES.
Gustav Bohn
E. B. Griffith.

INVENTOR.
Riley D. Snyder.
By C. P. Jacobs
Atty.

(No Model.) 2 Sheets—Sheet 2.

R. D. SNYDER.
GARDEN PLOW.

No. 391,654. Patented Oct. 23, 1888.

WITNESSES.
Gustav Bohn.
E. B. Griffith.

INVENTOR.
Riley D. Snyder.
By C. P. Jacobs,
Atty.

UNITED STATES PATENT OFFICE.

RILEY D. SNYDER, OF AVON, INDIANA.

GARDEN-PLOW.

SPECIFICATION forming part of Letters Patent No. 391,654, dated October 23, 1888.

Application filed June 16, 1887. Serial No. 241,502. (No model.)

*To all whom it may concern:*

Be it known that I, RILEY D. SNYDER, of Avon, county of Hendricks, and State of Indiana, have invented certain new and useful Improvements in Garden-Plows; and I do hereby declare that the following is a full, clear, and exact description thereof, reference being had to the accompanying drawings, in which like letters refer to like parts.

My invention relates to the construction of garden-plows having a wheel in front, and which are pushed by hand-power from behind, and will be understood from the following description.

Figure 1:
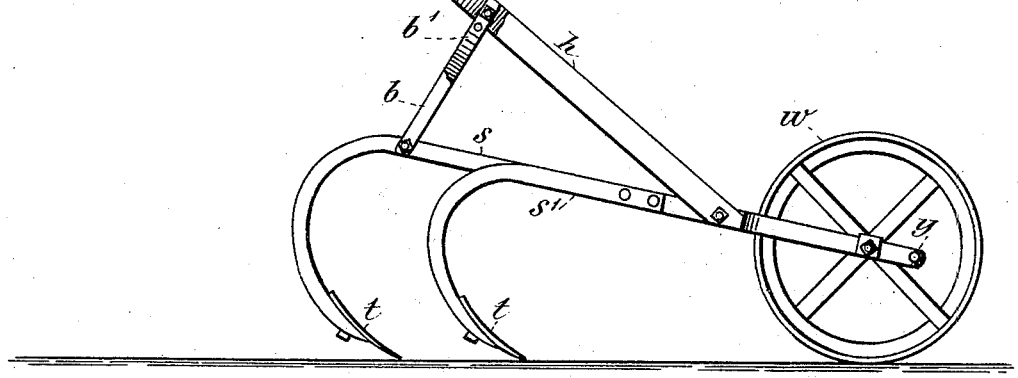
Figure 2:
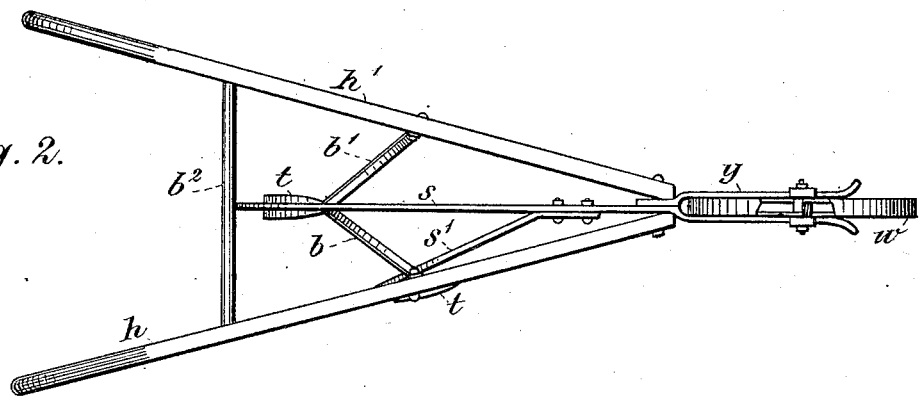
Figure 3:
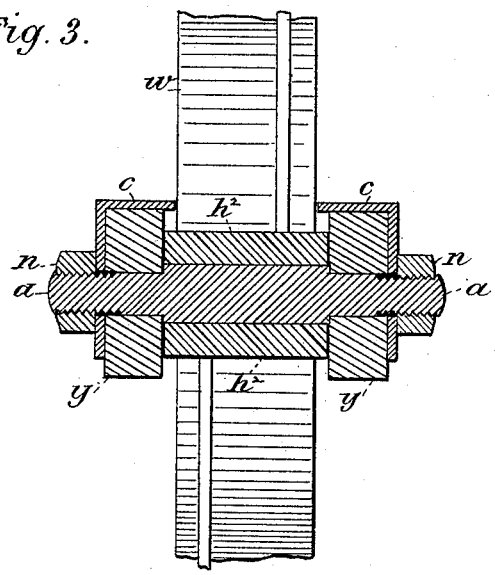
Figure 4:
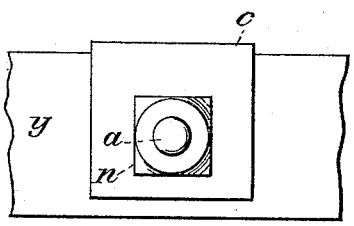

In the drawings, Figure 1 represents a side view of my plow, one of the handles and one of the braces being broken off to show the adjustable connection of the braces to the handle. Fig. 2 is a top view of the complete device. Fig. 3 is a horizontal section along the line of the center of the axle and the hub of the wheel, showing the construction and arrangement of these parts. Fig. 4 is a side view of a part of the frame and the cap that covers the joint between the hub, and such frame also showing the end of the axle.

In detail, $h$ $h'$ are handles connected by a brace, $b^2$, the handles being attached in front to the rear of the yoke $y$, as shown in Fig. 2. $w$ is the wheel of the plow, whose hub $h^2$ is mounted on the axle $a$. The central part of this axle, which is covered by the hub of the wheel, is of larger diameter than the ends outside the hub. These ends are of less diameter and pass through the sides of the yoke $y$ through the cap $c$, beyond which they are threaded to receive nuts on each end for holding the parts together, as shown in Fig. 3. The object of this construction of the axle is to allow the yoke $y$ to be drawn up close against the offsets on the axle on each side, making a close joint at that place without binding the wheel in its movement, and the caps $c$ are set in place over the ends of the axle, their horizontal parts covering the joint between the hub and the yoke and preventing dirt from falling in and interfering with the ease of movement of the wheel upon its bearings. The wheel itself is journaled in bearings in the yoke $y$, one arm of the latter being extended backward to form the main shank $s$, to which is bolted the tooth $t$. The lateral shank $s'$ is detachably connected by bolts to the main shank $s$ and carries another tooth, and, if desired, a similar lateral shank may be connected by the same bolts on the opposite side of the main shank. The teeth $t$ are detachably connected to the ends of the shanks $s$ $s'$.

The wheel $w$ may be made in any suitable form, and the frame is adapted to carry different sizes of teeth or shovels, as desired. The yoke is preferably extended forward on either side of the wheel, as shown in Fig. 2, the projections or outer ends having holes to receive a rope or tongue, so that, if desired, the operator pushing behind may be assisted by one drawing the plow in front.

The main shank $s$ is connected to each of the handles by braces $b$ $b'$, which are adjustable at their upper ends, having two or more holes, so that the handles may be set to accommodate the height of the operator.

The frame is made of wrought-iron and is very light, so that a boy may operate the plow, and the advantages of this construction are that the heavy cast-iron frame, such as is generally used, is entirely dispensed with. Again, the side teeth are carried upon one or more lateral shanks, and when it is desired to use only the central one the operator not only removes the side teeth, but the shanks that carry them, thus greatly lightening the plow and rendering it easier to operate. Practically the usual heavy frame is thus dispensed with altogether, and when the central tooth is used it will be seen that it is carried upon a straight shank, $s$, which is only a rear extension of the yoke $y$, in which the plow-wheel is journaled.

I am aware that garden-plows intended to be operated by a person pushing from behind and carrying one or more teeth or shovels are not new, and do not broadly claim the same as my invention, which consists in dispensing with the heavy cast-iron frame generally used and in substituting therefor a light central shank connected with the yoke and one or more lateral shanks which carry the teeth.

There are no cast-iron parts to my device whatever, and any part of it may be made and any part of it repaired at a common blacksmith-shop.

The wheel may be made of wrought-iron or wood or with a cast hub, if desired.

My invention therefore consists in the peculiar construction of my device, as hereinbefore described.

What I claim as my invention, and desire to secure by Letters Patent, is the following, viz:

In a plow, the combination, with the wheel $w$ and its axle, of the shank $s$, forming the plow-beam, and the yoke $y$, formed by bending outward the front portion of said shank to form one arm of said yoke and bolting thereon a bar similarly bent out to form the opposite arm, which yoke has the ends of its arms beyond the journals of the wheel $w$ bent or turned outward and perforated for the attachment of draft mechanism, substantially as specified.

In witness whereof I have hereunto set my hand this 14th day of June, 1887.

RILEY D. SNYDER.

Witnesses:
 C. P. JACOBS,
 E. B. GRIFFITH.